3,489,734
VULCANIZATION OF BUTYL RUBBER WITH DI-METHYLOL PHENOL, METAL SALT ACTIVATOR AND SYNERGISTIC ORGANIC DIHALIDE CO-CATALYST
Douglas I. Relyea, Pompton Plains, N.J., assignor to Uniroyal, Inc., New York, N.Y., a corporation of New Jersey
No Drawing. Filed Mar. 20, 1967, Ser. No. 624,130
Int. Cl. C08f 45/72
U.S. Cl. 260—85.3   7 Claims

ABSTRACT OF THE DISCLOSURE

Acceleration of the cure of butyl rubber with a dimethylol phenol curative, such as an alkylated phenol-formaldehyde resin, is achieved with a synergistic combination of a metal salt, such as stannous chloride, and certain organic halides, such as 1,2-dibromo-1,2-diphenylethane. The resulting vulcanizates have greatly improved resistance to heat aging.

---

This invention relates to the cure of butyl rubber and more particularly it relates to acceleration of the metal-salt-promoted phenolic resin cure of butyl rubber by the use of a cocatalyst.

The invention may be viewed as promotion of the phenolic resin cure of butyl rubber by the use of a synergistic combination of a metal salt and a new cocatalyst. The cocatalyst is chosen from the group consisting of:

(1) alpha-haloalkyl arenes in which the alkyl portion contains at least two carbon atoms, and alpha-halocycloalkyl arenes;
(2) beta-haloalkyl arenes
(3) 1,1-dihaloalkanes
(4) 1,2-dihaloalkanes
(5) halohydrins
(6) alpha-haloalkyl ethers
(7) beta-haloalkyl ethers
(8) alpha-haloalkyl thioethers
(9) beta-haloalkyl thioethers
(10) alpha-haloalkanoic acids, and esters and salts thereof.

Compounds belonging to two or more of these categories are also useful cocatalysts. As examples of these mixed compounds, one may cite

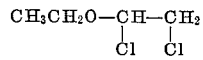

an alpha-haloalkylether, beta-haloalkylether and 1,2-dichloroalkane

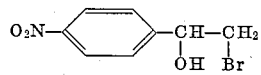

a beta-haloalkyl arene and halohydrin

The use of metal salts to promote the phenolic resin cure of butyl rubber is known; see, for example, U.S. Patent 2,726,224, Peterson and Batts, Dec. 6, 1955. It is also known that the cure can be accelerated by chlorinated paraffin wax, and that the action of such accelerator can be enhanced by a metal oxide or salt (U.S. Patent 2,727,874, Peterson and Batts, Dec. 20, 1955). Chlorosulfonated polyethylene, neoprene, chlorinated butyl rubber, and brominated butyl rubber are also known to have an accelerating effect on the phenolic resin cure of butyl rubber, especially in the presence of zinc oxide (2,734,039; 2,734,877; 2,749,323; 3,007,889). Accelerators and combinations of accelerators carried on molecular sieves are disclosed in 3,036,986, O'Connor and Thomas, May 29, 1962; the accelerating substances include such halogenated organic compounds as 1,4-dichlorobutene, benzoyl chloride, alpha,alpha,alpha-trichlorotoluene, and trifluoroacetic acid. Also, Belgian Patent 632,223 to Chemische Werke Albert discloses compounds of the type

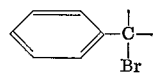

in conjunction with metallic halides as accelerators.

However, it has been desired to provide even more rapid or more effective cure than is ordinarily feasible by following the teachings of such prior art. The invention is based on the surprising discovery that there is a synergistic cooperation between (A) a metal salt and (B) certain organic halogen compounds as herein defined, whereby the phenolic resin cure of butyl rubber is rendered remarkably more effective by the combined use of the two materials (A) and (B) in such a cure. The products have excellent aging characteristics.

The phenolic resin curatives employed in the invention may be described as dimethylol phenols, especially as resinous condensation products of 2,6-dimethylol-4-hydrocarbylphenols, as disclosed for example in Tawney and Little 2,701,895. Usually the hydrocarbyl group has from 1 to 20 carbon atoms, and may be alkyl (preferably lower alkyl, i.e. 8 carbon atoms or less, more preferably 3 to 8 carbon atoms, e.g. tertiary-butyl and tertiary-octyl), cycloalkyl (e.g. cyclohexyl), aryl (e.g. phenyl), aralkyl (e.g. benzyl, cumyl). There may also be used halogenated forms of such materials; that is, especially halomethyl methylol phenols, including the resitols thereof, as described in U.S. Patent 2,972,600, Braidwood, Feb. 21, 1961 or British Patent 857,428, Esso Research and Engineering Co., May 30, 1958. Preferred halogenated curatives may be represented, in their monomeric form, by the structural formula:

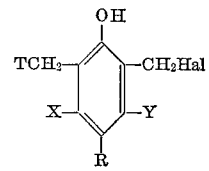

wherein Hal stands for halogen, especially bromine (preferred) or chlorine, T stands for an hydroxyl group or Hal as previously defined, X stands for hydrogen or hydrocarbyl (e.g., alkyl, aryl, aralkyl, having up to 16 carbon atoms), Y stands for hydrogen, hydroxy or hydrocarbyl as previously defined (especially alkyl having 1 to 8 carbon atoms), and R stands for a monovalent substituent such as a hydrocarbyl group as previously defined or a halogen (e.g. chlorine). Some examples are 2 - bromo-methyl-6-hydroxymethyl-4-tert-butylphenol, 2-chloromethyl - 6-hydroxymethyl-4-diisobutylphenol, and 2,6-di(bromomethyl)-4-phenylphenol.

Preferred curatives for use in the invention are multicyclic phenols, that is, dimers, trimers and higher polymers, containing multiple units of the foregoing kind, which may be represented by the formula:

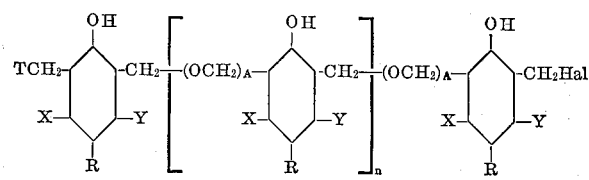

wherein Hal, T, X, Y, and R are as previously defined, A has a value of 0 or 1 and n has a value of 0 or averages 1 or 2 or higher (up to for example 5 or 6 or even higher).

A highly preferred class of multicyclic phenols of the foregoing kind are represented by those in which T is OH or bromine, Hal is bromine, X and Y are hydrogen, R is an alkyl group having 4 to 16 carbon atoms, A is 1 and n is not more than 2. Such multicyclic phenols are described in more detail by Braidwood, above cited, and the disclosure of Braidwood is therefore hereby incorporated herein by reference, as describing the preferred class of curatives. Such bromomethyl phenols as prepared commonly contain quantities of non-halogenated phenols; preferred preparations are those containing from 1% to 9% bromine, more preferably 4% to 5% bromine. The compositions as commonly prepared are also believed to include material in which A is 0; that is, not all of the phenolic nuclei are joined by either linkages. Both resols and resitols fall into this preferred category, as is explained by Braidwood.

Other preferred curatives used in the invention are those in which X and Y are hydrogen, A is 0, n is 0 or 1, Hal is chlorine, T is chlorine and R is chlorine; when n is 0 the curative is the dimer: 2,2'-methylenebis(4-chloro-6-chloromethylphenol).

Still other preferred curatives are those in which X and Y are hydrogen, A is 0, n is 0 or 1, Hal is chlorine, T is chlorine, and R is a lower alkyl (especially an alkyl group having from 2 to 6 carbon atoms). Thus, a particularly preferred chemical of this kind, wherein n is 1, is the trimer 2,6 - bis(2 - hydroxy - 3 - chloromethyl - 5 - tert-butylbenzyl)-4-tert-butyl phenol.

In the invention, the described halogen-free or halogenated dimethylolphenols are employed to cure or vulcanize the type of synthetic rubber known as butyl rubber, which may be described as a copolymer of an isoolefin such as isobutylene with a conjugated diolefin, such as isoprene. It usually contains not more than 10 or 15% of the diolefinic component, frequently less than 3%, and even lower, such as 0.5%. The butyl rubber may be of the well known halogenated kind, e.g., chlorinated or brominated.

The dimethylolphenol resin cure of the butyl rubber is accelerated in the process of the invention with a metal salt and an organic halogenated compound of the kind defined herein. The metal salts employed for this purpose may be described as heavy metal halides, in which category I include aluminum halides. Among these may be mentioned stannous or stannic chloride, zinc chloride, iron chloride, aluminum chloride, chromium chloride, and the like. Although the chlorides are preferred, other halides such as aluminum bromide or stannic iodide may be used.

Considering now in more detail the other accelerator or cocatalyst employed along with the metal salt in the synergistic combination of the invention, examples of these taken from the various useful categories are as follows:

alpha-haloalkylarenes:
1,2-dibromo-1,2-diphenylethane,
1,4-dibromotetralin (1,4-dibromo-1,2,3,4-tetrahydronaphthalene),
1,3-dibromoindane;
beta-haloalkylarenes:
2-bromoethyl benzene,
2-chloroethyl benzene,
2-bromoindanone;
1,1-dihalides:
1,2-dibromo-1,1-dichloroethane,
1,1-dichloro-3,3-dimethylbutane,
2,2-dibromopropane;
1,2-dihalides:
alpha,beta-dibromohydrocinnamamide,
1,2,4,5-tetrabromo-1,5-diphenylpentanone-3,
1-p-anisyl-1,2-dibromoethane,
1,2-dibromo-3-chloropropane,
1,2,3,4-tetrabromo-1,2,3,4-tetrahydronaphthalene,
alpha,beta-dibromoethylbenzene,
3,4-dibromo-tetrahydrothiophene 1,1-dioxide,
1,2-dibromo-1-phenyl butanone-3,
2,3-dibromo-propionitrile,
1,2-dibromo-1,5-diphenyl 4-pentenone-3;
halohydrins:
alpha-bromomethyl-4-nitrobenzyl alcohol,
alpha-bromomethyl benzyl alcohol,
alpha-bromomethyl-4-methoxybenzyl alcohol,
1-chloro-2-propanol,
2-bromo-1-indanol,
1,3-dichloro-2-propanol,
alpha-haloethers: e.g.,
1,2-dichloroethyl ethyl ether,
1-chloroheptyl ethyl ether,
1-chloroethyl cyclohexyl ether,
2,3-dichlorodioxane;
beta-haloethers:
1,2-dichloroethyl ethyl ether,
2-bromoethyl phenyl ether,
2-chloroethyl phenyl ether,
epichlorohydrin,
2-chloroethyl benzyl ether;
alpha-halothioethers:
1-chlorocyclohexyl phenyl sulfide,
1-chlorocyclohexyl butyl sulfide,
1-chloro-1-methylethyl phenyl sulfide;
beta-halothioethers:
o-chlorobenzyl 2-chloroethyl sulfide,
2,3,5,6-tetrakis(2-chloroethylthio)-hydroquinone,
2,3-dihydro-5,7,8-tris(2-chloroethylthio)-6-hydroxy-1,4-benzoxathiin;
alpha-haloacids and derivatives:
2,3-dichlorosuccinic acid,
ethyl 2-bromopropionate,
ethyl 3-bromopropionate,
alpha,beta-dibromobeta-phenylpropionic acid,
2,3-dibromosuccinic acid.

The amount of the dimethylolphenol curative employed in the invention may be in accordance with conventional practice. It will be understood that such amount can vary widely in practice depending on such factors as the particular butyl rubber employed, the particular dimethylol phenol used, the degree of cure desired, the amount and kinds of accelerators or other ingredients, the conditions of cure, etc. Usually the amount of curative used will fall within the range of from 1 to 20 parts by weight per 100 parts of butyl rubber. However, since the present synergistic cocatalyst system is capable of rendering the action of the curative more efficient, it is possible in practicing the invention to use less curative than in conventional practice, to achieve a desired level of cure. Both the metal salt and the cocatalyst (organic halogen compound) are ordinarily used in the range of from 0.2 to 10 phr. (parts per 100 of rubber) although other quantities can be used. The ratio of metal salt to cocatalyst is usually within the range of from 0.1:1 to 10:1 (by weight), preferably in the range from 0.5:1 to 2:1, although other ratios can be used if desired. The conditions under which the cure is carried out may be as in conventional practice, and as will be understood by the skilled rubber compounders will vary widely depending on the particular formulation, the specific article being made, the character of the heating device, etc. Because of the remarkable synergistic accelerating effect made possible by the invention, a given level of cure may be achieved under less severe conditions (shorter time and/or lower temperature) than in conventional practice. If desired, any other suitable conventional compounding ingredients may be present in the vulcanizable mixture of the invention, notably pigments or fillers such as carbon black or silica, antioxidants, processing aids, oil extenders, and the like.

The vulcanizate of the invention is suited to a wide variety of uses, among which may be mentioned curing bags, steam hose, belts, footwear, tires, inner tubes, etc.

A remarkable feature of the invention, as will be seen from the working examples below, is that the cocatalyst substances used in the invention to achieve synergistic acceleration with the metal salt promotor, actually in general tend to retard or prevent cure if used in the absence of the metal salt.

The following examples, in which all parts are expressed by weight, will serve to illustrate the practice of the invention in more detail. In the examples the following masterbatches were used:

| Masterbatch | 1 | 2 | 3 | 4 |
|---|---|---|---|---|
| Enjay Butyl 218 a | 100 | 100 | 100 | 100 |
| FEF Black | 35 | 35 | 35 | 35 |
| SRF Black | 30 | 30 | 30 | 30 |
| Paraffin Oil | 25 | 25 | 25 | 25 |
| Zinc oxide | | 4 | | 5 |
| Stearic acid | 1 | 1 | 1 | 1 |
| SP-1045 b | 10 | 10 | | |
| SP-1055 c | | | 10 | 10 |
| | 201 | 205 | 201 | 206 | a Isobutylene: Isoprene copolymer rubber, 1.5-2% unsaturation, Mooney 50-60 3 min. at 260° F.
b A commercial 2,6-dimethylol-4-octyl phenol resin.
c A commercial bromomethyl, alkylated, phenol-formaldehyde resin containing 3.6-3.9% bromine (see, for example, Example 2 of Braidwood 2,972,600).

EXAMPLE 1

This example demonstrates the synergistic combination of a metal salt and 1,2-dibromo-1,2-diphenylethane, the latter being the cocatalyst chosen from the class of alpha-haloalkyl arenes, and its effect in promoting the phenolic resin cure of butyl rubber.

| | A | B | C | D |
|---|---|---|---|---|
| Masterbatch 1 | 201 | 201 | 201 | 201 |
| 1,2-dibromo-1,2-diphenylethane | | 3.52 | | 3.52 |
| $SnCl_2 \cdot 2H_2O$ | | | 2.25 | 2.25 |
| Cured at 329° F. (90 p.s.i.g. steam): | | | | |
| Cured 5 min.: | | | | |
| Tensile, p.s.i. | 960 | 38 | 1,470 | 1,410 |
| Elongation, percent | 790 | 1,760 | 730 | 640 |
| M-200 | 90 | 30 | 250 | 335 |
| M-300 | 175 | 25 | 500 | 625 |
| Durometer | 27 | 15 | 30 | 40 |
| Cured 10 min.: | | | | |
| Tensile, p.s.i. | 1,200 | 145 | 1,330 | 1,370 |
| Elongation, percent | 730 | 1,210 | 640 | 440 |
| M-200 | 135 | 45 | 315 | 560 |
| M-300 | 265 | 55 | 625 | 940 |
| Durometer | 31 | 24 | 36 | 46 |
| Cured 15 min.: | | | | |
| Tensile, p.s.i. | 1,300 | 190 | 1,550 | 1,370 |
| Elongation, percent | 690 | 1,020 | 610 | 410 |
| M-200 | 170 | 50 | 350 | 625 |
| M-300 | 365 | 60 | 700 | 1,010 |
| Durometer | 33 | 26 | 40 | 47 |

Using the modulus of the rubber as a measure of the cure, Stock A shows the cure attainable with heat alone, Stock C shows this cure is accelerated by stannous chloride, Stock B shows the cure is greatly retarded by the alpha-phenethyl halide compound alone and Stock D shows the powerful accelerating effect of the metal salt-organic halide combination.

EXAMPLE 1-A

In this example, another cocatalyst, chosen from the same class of alpha-haloalkyl arenes, namely, 1,4-dibromo-1,2,3,4-tetrahydronaphthalene is included in the formulation, with the remarkable improvement in physical properties shown below. Note particularly Stock H vs. Stock F or Stock G.

| | E | F | G | H |
|---|---|---|---|---|
| Masterbatch 1 | 201 | 201 | 201 | 201 |
| $SnCl_2 \cdot 2H_2O$ | | 2.25 | | 2.25 |
| 1,4-dibromo-1,2,3,4-tetrahydronaphthalene | | | 2.90 | 2.90 |
| Cured at 329° F. (90 p.s.i.g. steam): | | | | |
| 5 minute cure: | | | | |
| Tensile, p.s.i. | 0 | 1,450 | 0 | 1,280 |
| Elongation, percent | 3,200 | 670 | 1,260 | 490 |
| M-200 | 10 | 295 | 25 | 350 |
| M-300 | 5 | 570 | 25 | 655 |
| Durometer | 13 | 40 | 15 | 40 |
| 10 minute cure: | | | | |
| Tensile, p.s.i. | 0 | 1,480 | 156 | 1,360 |
| Elongation, percent | 3,200 | 550 | 850 | 400 |
| M-200 | 20 | 380 | 55 | 570 |
| M-300 | 15 | 740 | 70 | 970 |
| Durometer | 18 | 42 | 24 | 46 |
| 15 minute cure: | | | | |
| Tensile, p.s.i. | 91 | 1,450 | 362 | 1,370 |
| Elongation, percent | 1,900 | 500 | 790 | 400 |
| M-200 | 30 | 420 | 75 | 670 |
| M-300 | 30 | 775 | 110 | 1,085 |
| Durometer | 20 | 42 | 27 | 48 |

EXAMPLE 1-B

This example demonstrates the use of another alpha-haloalkyl arene compound and its cocatalytic effect with a phenolic resin in curing butyl rubber with zinc oxide present in the stock.

| | I | J | K | L |
|---|---|---|---|---|
| Masterbatch 2 | 205 | 205 | 205 | 205 |
| $SnCl_2 \cdot 2H_2O$ | | 2.25 | | 2.25 |
| 1,2-dibromo-1,2-diphenylethane | | | 3.40 | 3.40 |
| Cured at 329° F. (90 p.s.i.g. steam): | | | | |
| 5 minute cure: | | | | |
| Tensile, p.s.i. | 20 | 465 | 1,300 | 1,260 |
| Elongation, percent | 2,900 | 760 | 830 | 760 |
| M-200 | 10 | 75 | 160 | 240 |
| M-300 | 5 | 105 | 275 | 425 |
| Durometer | 12 | 23 | 41 | 43 |
| 10 minute cure: | | | | |
| Tensile, p.s.i. | 40 | 1,230 | 1,300 | 1,320 |
| Elongation, percent | 2,110 | 880 | 800 | 690 |
| M-200 | 20 | 125 | 200 | 290 |
| M-300 | 20 | 225 | 350 | 510 |
| Durometer | 16 | 36 | 42 | 46 |
| 15 minute cure: | | | | |
| Tensile, p.s.i. | 60 | 1,340 | 1,280 | 1,340 |
| Elongation, percent | 1,130 | 820 | 740 | 650 |
| M-200 | 45 | 175 | 240 | 325 |
| M-300 | 55 | 325 | 420 | 565 |
| Durometer | 19 | 38 | 44 | 47 |

EXAMPLE 1-C

By substituting a brominated resin for a non-brominated resin in the formulation, results show that similar property improvements can be achieved as demonstrated in Examples 1 and 1-A.

| | M | N | O | P |
|---|---|---|---|---|
| Masterbatch 3 | 201 | 201 | 201 | 201 |
| $SnCl_2 \cdot 2H_2O$ | | 2.25 | | 2.25 |
| 1,3-dibromoindane | | | 2.76 | 2.76 |
| Cured at 329° F. (90 p.s.i.g. steam): | | | | |
| 5 minute cure: | | | | |
| Tensile, p.s.i. | 1,210 | 1,480 | 168 | 1,450 |
| Elongation, percent | 850 | 670 | 1,030 | 480 |
| M-200 | 130 | 275 | 40 | 465 |
| M-300 | 215 | 575 | 50 | 870 |
| Durometer | 30 | 36 | 20 | 38 |
| 10 minute cure: | | | | |
| Tensile, p.s.i. | 1,320 | 1,410 | 344 | 1,400 |
| Elongation, percent | 690 | 520 | 730 | 370 |
| M-200 | 185 | 340 | 55 | 720 |
| M-300 | 395 | 450 | 85 | 1,190 |
| Durometer | 34 | 38 | 25 | 47 |
| 15 minute cure: | | | | |
| Tensile, p.s.i. | 1,450 | 1,520 | 503 | 1,370 |
| Elongation, percent | 660 | 520 | 710 | 330 |
| M-200 | 240 | | 80 | 820 |
| M-300 | 510 | | 125 | 1,300 |
| Durometer | 33 | 37 | 27 | 47 |

The following examples, 2 thru 7, demonstrate the synergistic combination of a metal salt and a cocatalyst chosen from the class of 1,2 dihalides and its effect in promoting the phenolic resin cure of butyl rubber.

EXAMPLE 2

| | Q | R | S | T |
|---|---|---|---|---|
| Masterbatch 1 | 201 | 201 | 201 | 201 |
| 1,2,4,5-tetrabromo-1,5-diphenylpentanone-3 | 2.77 | | 2.77 | |
| $SnCl_2 \cdot 2H_2O$ | | 2.25 | 2.25 | |
| Cured at 329° F. (90 p.s.i.g. steam): | | | | |
| Cured 5 min.: | | | | |
| Tensile, p.s.i | 910 | 275 | 1,510 | 1,480 |
| Elongation, percent | 870 | 1,100 | 730 | 490 |
| M-200 | 70 | 40 | 225 | 525 |
| M-300 | 125 | 50 | 485 | 935 |
| Durometer | 24 | 21 | 34 | 43 |
| Cured 10 min.: | | | | |
| Tensile, p.s.i | 1,070 | 440 | 1,360 | 1,440 |
| Elongation, percent | 690 | 990 | 630 | 380 |
| M-200 | 115 | 50 | 285 | 700 |
| M-300 | 233 | 70 | 340 | 1,150 |
| Durometer | 28 | 22 | 36 | 45 |
| Cured 15 min.: | | | | |
| Tensile, p.s.i | 1,310 | 390 | 1,640 | 1,300 |
| Elongation, percent | 710 | 870 | 650 | 290 |
| M-200 | 165 | 50 | 323 | 360 |
| M-300 | 350 | 90 | 685 | 1,300 |
| Durometer | 30 | 24 | 57 | 46 |

EXAMPLE 3

| | U | V | W | X |
|---|---|---|---|---|
| Masterbatch 1 | 201 | 201 | 201 | 201 |
| $SnCl_2 \cdot 2H_2O$ | | 2.25 | | 2.25 |
| 1,2,3,4-tetrabromo-1,2,3,4-tetrahydronaphthalene | | | 4.48 | 4.48 |
| Cured at 329° F. (90 p.s.i.g. steam): | | | | |
| 5 minute cure: | | | | |
| Tensile, p.s.i | 39 | 1,390 | 42 | 1,320 |
| Elongation, percent | 750 | 650 | 1,140 | 440 |
| M-200 | 10 | 290 | 20 | 570 |
| M-300 | 5 | 550 | 15 | 925 |
| Durometer | 12 | 36 | 12 | 44 |
| 10 minute cure: | | | | |
| Tensile, p.s.i | 43 | 1,410 | 44 | 1,240 |
| Elongation, percent | 2,510 | 540 | 1,290 | 310 |
| M-200 | 20 | 365 | 25 | 770 |
| M-300 | 15 | 700 | 30 | 1,160 |
| Durometer | 15 | 41 | 18 | 48 |
| 15 minute cure: | | | | |
| Tensile, p.s.i | 134 | 1,490 | 278 | 1,260 |
| Elongation, percent | 1,690 | 520 | 970 | 280 |
| M-200 | 25 | 415 | 50 | 875 |
| M-300 | 25 | 780 | 65 | 1,360 |
| Durometer | 18 | 42 | 22 | 50 |

EXAMPLE 4

| | Y | Z | AA | AB | AC |
|---|---|---|---|---|---|
| Masterbatch 3 | 201 | 201 | 201 | 201 | 201 |
| Alpha,beta-dibromoethylbenzene | 2.64 | | 2.64 | 1.32 | 0.66 |
| $SnCl_2 \cdot 2H_2O$ | | 2.25 | 2.25 | 2.25 | 2.25 |
| Cured at 329° F. (90 p.s.i.g. steam): | | | | | |
| 5 minute cure: | | | | | |
| Tensile, p.s.i | 830 | 1,520 | 1,470 | 1,390 | 1,460 |
| Elongation, percent | 890 | 610 | 580 | 610 | 7000 |
| M-200 | 65 | 285 | 360 | 270 | 190 |
| M-300 | 95 | 590 | 715 | 540 | 400 |
| Durometer | 24 | 35 | 38 | 35 | 30 |
| 10 minute cure: | | | | | |
| Tensile, p.s.i | 1,020 | 1,510 | 1,430 | 1,510 | 1,460 |
| Elongation, percent | 770 | 490 | 410 | 500 | 600 |
| M-200 | 100 | 365 | 610 | 460 | 285 |
| M-300 | 195 | 735 | 1,000 | 865 | 590 |
| Durometer | 29 | 37 | 45 | 39 | 34 |
| 15 minute cure: | | | | | |
| Tensile, p.s.i | 1,260 | 1,560 | 1,360 | 1,410 | 1,440 |
| Elongation, percent | 700 | 490 | 360 | 380 | 480 |
| M-200 | 130 | 425 | 725 | 635 | 380 |
| M-300 | 275 | 850 | 1,130 | 1,090 | 770 |
| Durometer | 30 | 39 | 46 | 45 | 39 |

EXAMPLE 5

| | AD | AE | AF | AG |
|---|---|---|---|---|
| Masterbatch 3 | 201 | 201 | 201 | 201 |
| 1-p-anisyl-1,2-dibromoethane | | 2.94 | | 2.94 |
| $SnCl_2 \cdot 2H_2O$ | | | 2.25 | 2.25 |
| Cured at 329° F. (90 p.s.i.g. steam): | | | | |
| 5 minute cure: | | | | |
| Tensile, p.s.i | 620 | 0 | 1,480 | 1,230 |
| Elongation, percent | 1,030 | 2,150 | 720 | 350 |
| M-200 | 50 | 20 | 255 | 615 |
| M-300 | 80 | 15 | 510 | 1,050 |
| Durometer | 25 | 15 | 36 | 48 |
| 10 minute cure: | | | | |
| Tensile, p.s.i | 950 | 40 | 1,490 | 1,340 |
| Elongation, percent | 870 | 1,490 | 640 | 300 |
| M-200 | 90 | 20 | 300 | 720 |
| M-300 | 165 | 20 | 600 | 1,200 |
| Durometer | 30 | 18 | 39 | 52 |
| 15 minute cure: | | | | |
| Tensile, p.s.i | 1,230 | 165 | 1,460 | 1,360 |
| Elongation, percent | 880 | 1,060 | 570 | 290 |
| M-200 | 125 | 45 | 340 | 820 |
| M-300 | 250 | 55 | 680 | (1,400) |
| Durometer | 31 | 20 | 39 | 53 |

EXAMPLE 6

| | AH | AI | AJ | AK | AL | AM |
|---|---|---|---|---|---|---|
| Masterbatch 3 | 201 | 201 | 201 | 201 | 201 | 201 |
| 1,2-dibromo-1-phenylbutanone-3 | 3.06 | | 3.06 | 1.53 | 0.77 | 0.38 |
| $SnCl_2 \cdot 2H_2O$ | | 2.25 | 2.25 | 2.25 | 2.25 | 2.25 |
| Cured at 329° F. (90 p.s.i.g. steam): | | | | | | |
| 5 minute cure: | | | | | | |
| Tensile, p.s.i | 510 | 1,520 | 1,160 | 1,480 | 1,430 | 1,420 |
| Elongation, percent | 920 | 610 | 330 | 530 | 620 | 650 |
| M-200 | 50 | 285 | 560 | 420 | 250 | 210 |
| M-300 | 70 | 590 | 950 | 790 | 525 | 440 |
| Durometer | 21 | 35 | 40 | 38 | 35 | 32 |
| 10 minute cure: | | | | | | |
| Tensile, p.s.i | 760 | 1,510 | 1,230 | 1,420 | 1,360 | 1,400 |
| Elongation, percent | 810 | 490 | 280 | 380 | 470 | 510 |
| M-200 | 70 | 365 | 750 | 650 | 390 | 300 |
| M-300 | 120 | 735 | 1,100 | 1,100 | 750 | 635 |
| Durometer | 25 | 37 | 47 | 42 | 39 | 37 |
| 15 minute cure: | | | | | | |
| Tensile, p.s.i | 850 | 1,560 | 1,350 | 1,450 | 1,510 | 1,580 |
| Elongation, percent | 680 | 490 | 290 | 340 | 430 | 530 |
| M-200 | 100 | 425 | 830 | 765 | 490 | 380 |
| M-300 | 190 | 850 | 1,235 | 1,215 | 910 | 775 |
| Durometer | 32 | 39 | 49 | 46 | 42 | 38 |

EXAMPLE 7

| | AN | AO | AP | AQ |
|---|---|---|---|---|
| Masterbatch 3 | 201 | 201 | 201 | 201 |
| Stannous chloride dihydrate | | 2.25 | | 2.25 |
| Apha,beta-dibromohydrocinnamamide | | | 3.07 | 3.07 |
| Cured at 329° F. (90 p.s.i.g. steam): | | | | |
| 5 min. cure: | | | | |
| Tensile, p.s.i | 907 | 1,510 | 0 | 1,450 |
| Elongation, percent | 870 | 730 | 2,720 | 630 |
| M-200 | 70 | 225 | 25 | 370 |
| M-300 | 125 | 485 | 25 | 685 |
| Durometer | 24 | 34 | 15 | 42 |
| 10 min. cure: | | | | |
| Tensile, p.s.i | 1,070 | 1,560 | 0 | 1,480 |
| Elongation, percent | 690 | 630 | 1,820 | 530 |
| M-200 | 115 | 285 | 25 | 500 |
| M-300 | 235 | 340 | 25 | 875 |
| Durometer | 28 | 36 | 16 | 47 |
| 15 min. cure: | | | | |
| Tensile, p.s.i | 1,310 | 1,640 | 38 | 1,460 |
| Elongation, percent | 710 | 650 | 1,390 | 450 |
| M-200 | 165 | 325 | 25 | 615 |
| M-300 | 350 | 685 | 25 | 1,005 |
| Durometer | 30 | 57 | 16 | 47 |

EXAMPLE 8

This example is similar to the preceding examples except that the cocatalyst is chosen from the classes of 1,1- and 1,2-dihalides

| | AR | AS | AT |
|---|---|---|---|
| Masterbach 1 | 201 | 201 | 201 |
| 1,2-dibromo-1,1-dichloroethane | | | 2.57 |
| $SnCl_2 \cdot 2H_2O$ | | 2.25 | 2.25 |
| Cured at 329° F. (90 p.s.i.g. steam) for the indicated times: | | | |
| Cured 5 min.: | | | |
| Tensile, p.s.i | 1,060 | 1,530 | 1,390 |
| Elongation, percent | 900 | 710 | 600 |
| M-200 | 80 | 250 | 250 |
| M-300 | 155 | 540 | 525 |
| Durometer | 26 | 33 | 37 |
| Cured 10 min.: | | | |
| Tensile, p.s.i | 1,320 | 1,600 | 1,370 |
| Elongation, percent | 820 | 640 | 420 |
| M-200 | 120 | 300 | 510 |
| M-300 | 245 | 640 | 725 |
| Durometer | 29 | 36 | 46 |
| Cured 15 min.: | | | |
| Tensile, p.s.i | 1,340 | 1,540 | 1,400 |
| Elongation, percent | 710 | 470 | 330 |
| M-200 | 160 | 350 | 750 |
| M-300 | 335 | 740 | 1,300 |
| Durometer | 32 | 37 | 48 |

EXAMPLE 9

In the case of Examples 9 thru 11, the cocatalyst is chosen from the class of halohydrins.

|  | AU | AV | AW | AX |
|---|---|---|---|---|
| Masterbatch 1 | 201 | 201 | 201 | 201 |
| Alpha-bromomethyl-4-nitrobenzyl alcohol | 2.46 | 2.46 |  | 2.46 |
| SnCl₂·2H₂O |  |  | 2.25 | 2.25 |
| Cured at 329° F. (90 p.s.i.g. steam): |  |  |  |  |
| Cured 5 min.: |  |  |  |  |
| Tensile, p.s.i | 620 | 450 | 1,490 | 1,170 |
| Elongation, percent | 1,030 | 1,040 | 710 | 590 |
| M-200 | 50 | 35 | 235 | 210 |
| M-300 | 80 | 75 | 483 | 420 |
| Durometer | 25 | 23 | 37 | 30 |
| Cured 10 min.: |  |  |  |  |
| Tensile, p.s.i | 950 | 760 | 1,440 | 1,270 |
| Elongation, percent | 870 | 880 | 610 | 490 |
| M-200 | 90 | 80 | 305 | 325 |
| M-300 | 165 | 135 | 610 | 625 |
| Durometer | 30 | 29 | 38 | 40 |
| Cured 15 min.: |  |  |  |  |
| Tensile, p.s.i | 1,230 | 1,180 | 1,540 | 1,200 |
| Elongation, percent | 880 | 880 | 350 | 400 |
| M-200 | 125 | 100 | 340 | 440 |
| M-300 | 250 | 300 | 690 | 840 |
| Durometer | 31 | 32 | 40 | 43 |

The data show halohydrin-metal salt combinations retard early cure, promote later cure (both being desirable effects).

EXAMPLE 10

|  | AY | AZ | BA | BB |
|---|---|---|---|---|
| Masterbatch 3 | 201 | 201 | 201 | 201 |
| SnCl₂·2H₂O |  | 2.25 |  | 2.25 |
| Alpha-bromomethyl-4-methoxybenzyl alcohol |  |  | 2.31 | 2.31 |
| Cured at 329° F. (90 p.s.i.g. steam): |  |  |  |  |
| Cured 5 min.: |  |  |  |  |
| Tensile, p.s.i | 1,210 | 1,480 | 38 | 1,450 |
| Elongation, percent | 850 | 670 | 1,330 | 390 |
| M-200 | 130 | 275 | 25 | 625 |
| M-300 | 215 | 575 | 25 | 1,115 |
| Durometer | 30 | 36 | 18 | 49 |
| Cured 10 min.: |  |  |  |  |
| Tensile, p.s.i | 1,320 | 1,410 | 253 | 1,320 |
| Elongation, percent | 690 | 520 | 1,100 | 270 |
| M-200 | 185 | 340 | 40 |  |
| M-300 | 395 | 450 | 50 |  |
| Durometer | 34 | 38 | 25 | 52 |
| Cured 15 min.: |  |  |  |  |
| Tensile, p.s.i | 1,450 | 1,520 | 405 | 1,040 |
| Elongation, percent | 660 | 520 | 900 | 230 |
| M-200 | 240 |  | 50 |  |
| M-300 | 510 |  | 80 |  |
| Durometer | 33 | 37 | 24 | 52 |

EXAMPLE 11

|  | BC | BD | BE | BF |
|---|---|---|---|---|
| Masterbatch 3 | 201 | 201 | 201 | 201 |
| SnCl₂·2H₂O |  | 2.25 | 2.25 |  |
| 1-chloro-2-propanol | 0.95 | 0.95 |  |  |
| Cured at 329° F. (90 p.s.i.g. steam): |  |  |  |  |
| Cured 5 min.: |  |  |  |  |
| Tensile, p.s.i | 1,150 | 1,540 | 1,430 | 1,210 |
| Elongation, percent | 740 | 630 | 610 | 850 |
| M-200 | 115 | 285 | 260 | 130 |
| M-300 | 225 | 600 | 540 | 215 |
| Durometer | 29 | 35 | 35 | 30 |
| Cured 10 min.: |  |  |  |  |
| Tensile, p.s.i | 1,380 | 1,520 | 1,440 | 1,320 |
| Elongation, percent | 690 | 510 | 520 | 690 |
| M-200 | 185 | 380 | 350 | 185 |
| M-300 | 380 | 775 | 715 | 395 |
| Durometer | 31 | 37 | 38 | 34 |
| Cured 15 min.: |  |  |  |  |
| Tensile, p.s.i | 1,490 | 1,520 | 1,520 | 1,450 |
| Elongation, percent | 700 | 460 | 510 | 660 |
| M-200 | 220 | 470 | 420 | 240 |
| M-300 | 700 | 920 | 820 | 510 |
| Durometer | 33 | 38 | 40 | 33 |

EXAMPLE 12

This example demonstrates the effectiveness of the cocatalyst chosen from the class of alpha-haloethers.

|  | BG | BH | BI | BJ |
|---|---|---|---|---|
| Masterbatch 1 | 201 | 201 | 201 | 201 |
| 1,2-dichloroethyl ethyl ether |  | 1.43 |  | 1.43 |
| SnCl₂·2H₂O |  |  | 2.25 | 2.25 |
| Cured at 329° F. (90 p.s.i.g. steam): |  |  |  |  |
| Cured 5 min.: |  |  |  |  |
| Tensile, p.s.i | 1,130 | 85 | 1,590 | 1,410 |
| Elongation, percent | 870 | 1,340 | 710 | 590 |
| M-200 | 90 | 30 | 240 | 225 |
| M-300 | 140 | 30 | 500 | 490 |
| Durometer | 25 | 17 | 33 | 32 |
| Cured 10 min.: |  |  |  |  |
| Tensile, p.s.i | 1,470 | 340 | 1,660 | 1,580 |
| Elongation, percent | 800 | 1,010 | 610 | 500 |
| M-200 | 135 | 40 | 290 | 430 |
| M-300 | 260 | 55 | 620 | 860 |
| Durometer | 30 | 20 | 36 | 40 |
| Cured 15 min.: |  |  |  |  |
| Tensile, p.s.i | 1,530 | 480 | 1,590 | 1,490 |
| Elongation, percent | 710 | 880 | 540 | 370 |
| M-200 | 180 | 60 | 350 | 660 |
| M-300 | 385 | 90 | 730 | 1,135 |
| Durometer | 32 | 23 | 37 | 44 |

EXAMPLE 13

This example is similar to Example 12 except that the cocatalyst is a beta haloether.

|  | BK | BL | BM | BN |
|---|---|---|---|---|
| Masterbatch 3 | 201 | 201 | 201 | 201 |
| Stannous chloride dihydrate |  | 2.25 |  | 2.25 |
| Beta-bromoethyl phenylether |  |  | 2.01 | 2.01 |
| Cured at 329° F. (90 p.s.i.g. steam): |  |  |  |  |
| Cured 5 min.: |  |  |  |  |
| Tensile, p.s.i | 1,130 | 1,590 | 1,070 | 1,560 |
| Elongation, percent | 870 | 710 | 850 | 670 |
| M-200 | 90 | 240 | 85 | 260 |
| M-300 | 140 | 500 | 160 | 550 |
| Durometer | 25 | 33 | 24 | 33 |
| Cured 10 min.: |  |  |  |  |
| Tensile, p.s.i | 1,470 | 1,660 | 1,350 | 1,600 |
| Elongation, percent | 800 | 610 | 780 | 590 |
| M-200 | 135 | 290 | 125 | 320 |
| M-300 | 260 | 620 | 260 | 670 |
| Durometer | 30 | 36 | 27 | 36 |
| Cured 15 min.: |  |  |  |  |
| Tensile, p.s.i | 1,530 | 1,590 | 1,490 | 1,600 |
| Elongation, percent | 710 | 540 | 750 | 530 |
| M-200 | 180 | 350 | 155 | 400 |
| M-300 | 385 | 730 | 330 | 815 |
| Durometer | 32 | 37 | 30 | 37 |

EXAMPLE 14

This example demonstrates the effectiveness of cocatalysts chosen from the class of beta-halothioethers.

|  | BO | BP | BQ | BR | BS | BT | BU | BV |
|---|---|---|---|---|---|---|---|---|
| Masterbatch 1 | 201 | 201 | 201 | 201 | 201 | 201 | 201 | 201 |
| o-Chlorobenzyl 2-chloroethyl sulfide |  | 2.21 | 2.21 |  |  |  |  |  |
| 2,3-dihydro-5,7,8-tris(2-chloroethylthio)-6-hydroxy-1,4-benzoxathiin |  |  |  |  | 3.88 | 3.88 |  |  |
| 2,3,5,6-tetrakis(2-chloroethylthio)-1,4-hydroquinone |  |  |  |  |  |  | 4.24 | 4.24 |
| SnCl₂·2H₂O |  |  | 2.25 |  | 2.25 |  | 2.25 |  |
| Cured at 329° F. (90 p.s.i.g. steam): |  |  |  |  |  |  |  |  |
| Cured 5 min.: |  |  |  |  |  |  |  |  |
| Tensile, p.s.i | 1,540 | 1,600 | 780 | 1,530 | 35 | 1,500 | 35 | 1,540 |
| Elongation, percent | 720 | 620 | 940 | 680 | 1,700 | 520 | 1,710 | 550 |
| M-200 | 190 | 310 | 65 | 235 | 25 | 565 | 25 | 460 |
| M-300 | 390 | 630 | 110 | 480 | 25 | 925 | 25 | 825 |
| Durometer | 35 | 37 | 25 | 35 | 12 | 47 | 12 | 44 |
| Cured 10 min.: |  |  |  |  |  |  |  |  |
| Tensile, p.s.i | 1,440 | 1,640 | 1,150 | 1,710 | 120 | 1,280 | 70 | 1,450 |
| Elongation, percent | 520 | 570 | 850 | 490 | 1,140 | 290 | 1,070 | 300 |
| M-200 | 290 | 375 | 90 | 385 | 30 | 710 | 35 | 790 |
| M-300 | 585 | 760 | 175 | 760 | 40 | 1,100 | 45 | 1,235 |
| Durometer | 37 | 38 | 27 | 40 | 14 | 50 | 15 | 50 |
| Cured 15 min.: |  |  |  |  |  |  |  |  |
| Tensile, p.s.i | 1,620 | 1,560 | 1,310 | 1,580 | 185 | 1,330 | 230 | 1,510 |
| Elongation, percent | 630 | 490 | 820 | 460 | 920 | 340 | 960 | 340 |
| M-200 | 325 | 410 | 120 | 470 | 45 | 730 | 45 | 810 |
| M-300 | 695 | 830 | 235 | 900 | 60 | 1,110 | 60 | 1,225 |
| Durometer | 39 | 38 | 30 | 42 | 16 | 50 | 17 | 50 |

EXAMPLE 15

Examples 15 thru 17 show that yet another class of co-catalysts—the alpha-halo acids and their derivatives—promotes the phenolic resin cure of butyl rubber when used in conjunction with a metal salt.

|  | BW | BX | BY | BZ |
|---|---|---|---|---|
| Masterbatch 4 | 206 | 206 | 206 | 206 |
| 2,3-dichlorosuccinic acid |  | 1.87 |  | 1.87 |
| SnCl₂·2H₂O |  |  | 2.25 | 2.25 |
| Cured at 329° F. (90 p.s.i.g. steam): |  |  |  |  |
| Cured 5 min.: |  |  |  |  |
| Tensile, p.s.i | 720 | 710 | 1,310 | 1,270 |
| Elongation, percent | 1,050 | 810 | 840 | 710 |
| M-200 | 70 | 85 | 155 | 210 |
| M-300 | 110 | 135 | 275 | 365 |
| Durometer | 26 | 28 | 35 | 40 |
| Cured 10 min.: |  |  |  |  |
| Tensile, p.s.i | 1,260 | 1,310 | 1,450 | 1,270 |
| Elongation, percent | 760 | 760 | 740 | 630 |
| M-200 | 165 | 185 | 240 | 310 |
| M-300 | 310 | 340 | 425 | 540 |
| Durometer | 31 | 39 | 40 | 44 |
| Cured 15 min.: |  |  |  |  |
| Tensile, p.s.i | 1,400 | 1,320 | 1,460 | 1,270 |
| Elongation, percent | 740 | 690 | 680 | 570 |
| M-200 | 235 | 235 | 285 | 355 |
| M-300 | 435 | 435 | 510 | 615 |
| Durometer | 36 | 40 | 40 | 45 |

EXAMPLE 16

|  | CA | CB | CC | CD |
|---|---|---|---|---|
| Masterbatch 4 | 206 | 206 | 206 | 206 |
| Alpha,beta-dibromobeta-phenylpropionic acid |  | 3.08 |  | 1.54 |
| SnCl₂·2H₂O |  |  | 2.25 | 2.25 |
| Cured at 329° F. (90 p.s.i.g. steam): |  |  |  |  |
| Cured 5 min.: |  |  |  |  |
| Tensile, p.s.i | 765 | 1,190 | 1,260 | 1,270 |
| Elongation, percent | 960 | 730 | 900 | 780 |
| M-200 | 70 | 185 | 130 | 165 |
| M-300 | 115 | 330 | 225 | 300 |
| Durometer | 31 | 42 | 35 | 42 |
| Cured 10 min.: |  |  |  |  |
| Tensile, p.s.i | 1,320 | 1,250 | 1,340 | 1,290 |
| Elongation, percent | 820 | 660 | 760 | 690 |
| M-200 | 140 | 250 | 200 | 265 |
| M-300 | 265 | 440 | 350 | 465 |
| Durometer | 34 | 46 | 37 | 45 |
| Cured 15 min.: |  |  |  |  |
| Tensile, p.s.i | 1,410 | 1,260 | 1,360 | 1,340 |
| Elongation, percent | 740 | 630 | 710 | 650 |
| M-200 | 210 | 290 | 250 | 310 |
| M-300 | 400 | 500 | 480 | 535 |
| Durometer | 38 | 46 | 38 | 45 |

EXAMPLE 17

|  | CE | CF | CG | CH |
|---|---|---|---|---|
| Masterbatch 4 | 206 | 206 | 206 | 206 |
| Ethyl 3-bromopropionate |  | 1.81 |  | 1.81 |
| SnCl₂·2H₂O |  |  | 2.25 | 2.25 |
| Cured at 329° F. (90 p.s.i.g. steam): |  |  |  |  |
| Cured 5 min.: |  |  |  |  |
| Tensile, p.s.i | 660 | 1,210 | 620 | 1,240 |
| Elongation, percent | 960 | 870 | 950 | 890 |
| M-200 | 50 | 105 | 60 | 110 |
| M-300 | 75 | 175 | 85 | 195 |
| Durometer | 26 | 32 | 25 | 34 |
| Cured 10 min.: |  |  |  |  |
| Tensile, p.s.i | 1,340 | 1,430 | 1,450 | 1,370 |
| Elongation, percent | 860 | 780 | 820 | 860 |
| M-200 | 115 | 180 | 150 | 190 |
| M-300 | 215 | 325 | 275 | 365 |
| Durometer | 31 | 36 | 33 | 39 |
| Cured 15 min.: |  |  |  |  |
| Tensile, p.s.i | 1,510 | 1,490 | 1,490 | 1,440 |
| Elongation, percent | 750 | 750 | 720 | 680 |
| M-200 | 180 | 225 | 220 | 250 |
| M-300 | 345 | 425 | 415 | 460 |
| Durometer | 35 | 38 | 38 | 38 |

EXAMPLE 18

This example further demonstrates at least a threefold improvement in heat stability characteristics of phenolic resin-cured butyl rubber vulcanizates using a combination of the metal salt and 1,2-dibromo-1,2-diphenylethane. Heat stability was determined by stress relaxation measurements.[1]

|  | CI | CJ |
|---|---|---|
| Butyl Rubber 215 (1.5-2% unsat.) | 100 | 100 |
| Conductive Furnace Carbon Black | 45 | 45 |
| 160/180 Oil | 2 | 2 |
| Zinc Oxide | 1 | 1 |
| SP-1045 | 10 | 10 |
| 1,2-dibromo-1,2-diphenylethane |  | 3 |
| Stannous chloride | 1.8 | 1.8 |

| Physical Properties (Cure Temp. 153° C.) | Time of Cure | | |
|---|---|---|---|
| Modulus at 300% Elong | 1 hr | 800 | 1,255 |
|  | 2 hrs | 945 | 1,330 |
| Stress Relaxation (in air at 160° C.) T₀.₅[2] | 1 hr | 6.8 | 21.0 |
|  | 2 hrs | 7.4 | 24.0 |
| Percent Residual Stress (after 12 hrs. in Argon at 160° C.) | 1 hr | 69.0 | 91.0 |

[1] Stress relaxation is described in J. Poly. Science, 35, 267–8 (1959); Trans. Faraday Soc. 54 (5), 740; Trans. IRI 35, 82, 1959, and Trans. IRI, 34, 228, 1958.

[2] T₀.₅ = Time, in hours, for the stress to fall to one half the original value at 160° C. in air.

Having thus described my invention, what I claim and desire to protect by Letters Patent is:

1. A vulcanizable composition comprising a mixture of
   (A) butyl rubber
   (B) a dimethylol phenol curative for said rubber
   (C) a metal salt activator for said curative, and
   (D) as a synergistically acting co-catalyst for the cure, a chemical selected from the group consisting of:
      (1) alpha-haloalkyl arenes in which the alkyl portion has at least two carbon atoms, and alpha-halocycloalkyl arenes
      (2) beta-haloalkyl arenes
      (3) 1,1-dihaloalkanes
      (4) 1,2-dihaloalkanes
      (5) halohydrins
      (6) alpha-haloalkyl ethers
      (7) beta-haloalkyl ethers
      (8) alpha-haloalkyl thioethers
      (9) beta-haloalkyl thioethers, and
      (10) alpha-haloalkanoic acids, and esters and salts thereof.

2. A method of vulcanizing butyl rubber comprising subjecting to vulcanizing conditions the composition of claim 1.

3. A vulcanizable composition as in claim 1 in which (C) is stannous chloride and (D) is 1,2-dibromo-1,2-diphenyl ethane.

4. A method in claim 2 in which (C) is stannous chloride and (D) is 1,2-dibromo-1,2-diphenyl ethane.

5. A vulcanizable composition as in claim 1 in which (B) is selected from the group consisting of 2,6-dimethylol-4-alkyl phenol resin and brominated 2,6-dimethylol-4-alkyl phenol resin.

6. A method as in claim 2 in which (B) is selected from the group consisting of 2,6-dimethylol-4-alkyl phenol resin and brominated 2,6-dimethylol-4-alkyl phenol resin.

7. A vulcanizable composition as in claim 1 in which (D) is 2,3,5,6-tetrakis(2-chloroethylthio)-hydroquinone.

References Cited

UNITED STATES PATENTS 2,726,244  12/1955  Peterson et al. _____ 260—38

FOREIGN PATENTS 558,223  6/1958  Canada.
680,776  2/1964  Canada.

JOSEPH L. SCHOFER, Primary Examiner

R. A. GAITHER, Assistant Examiner